Patented Aug. 13, 1929.

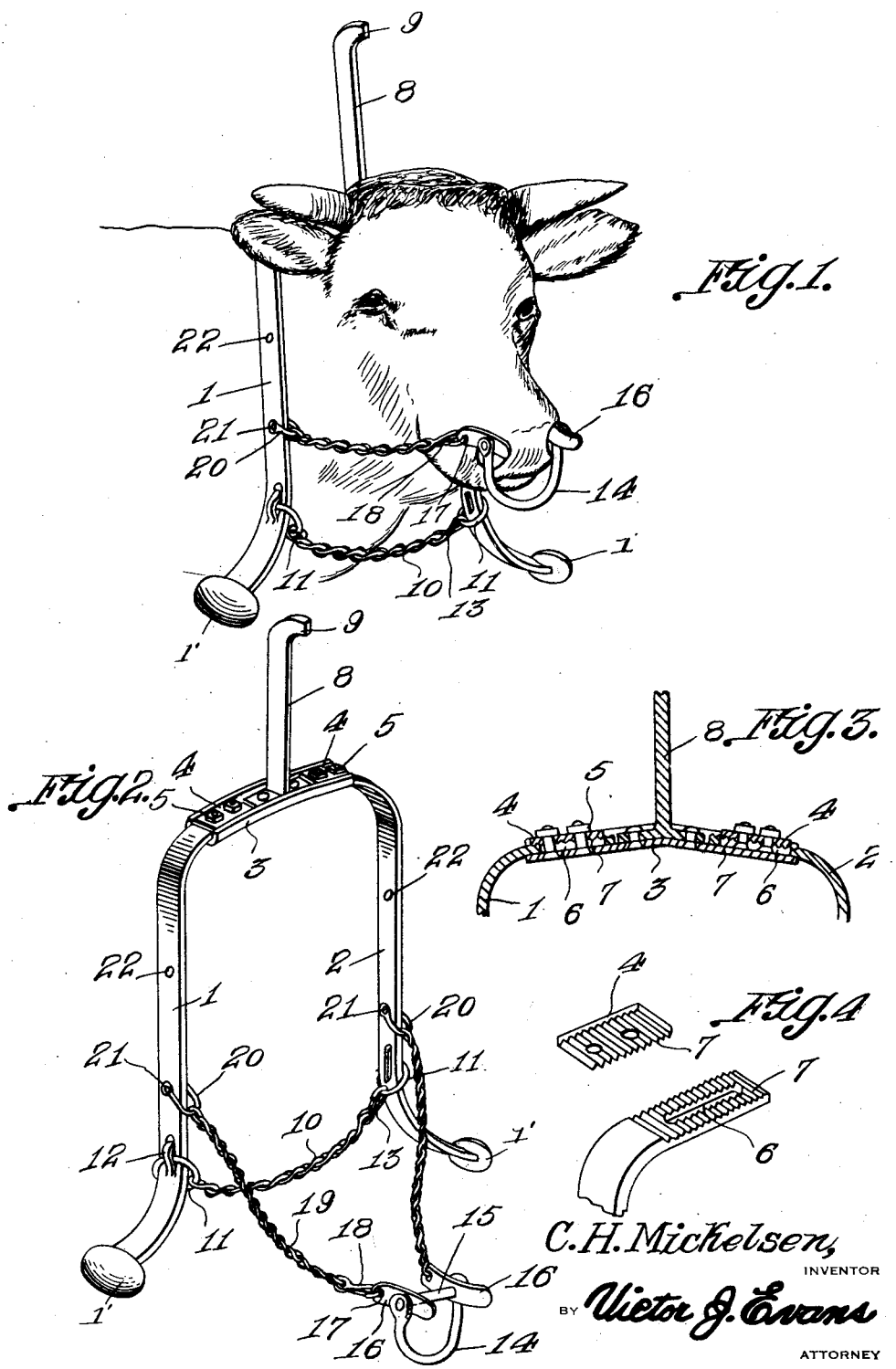

1,724,768

UNITED STATES PATENT OFFICE.

CANUTE H. MICKELSEN, OF TETONIA, IDAHO.

RESTRAINING DEVICE.

Application filed November 18, 1926. Serial No. 149,189.

This invention relates to a yoke and nose device for a bull, the general object of the invention being to provide a yoke which will prevent the animal from passing through a fence and a nose device which is so connected with the yoke that when the animal attempts to run, movement of the yoke will be communicated to the nose device so that the pressure of the said device on the nostrils of the bull will stop him from running.

Another object of the invention is to make the device adjustable so that it can be used on animals of different sizes.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention in use on a bull.

Figure 2 is a perspective view of the device itself.

Figure 3 is a sectional view through the upper portion of the device, showing the means for permitting the device to be adjusted.

Figure 4 is a view of the washer plate and a portion of one of the side members of the device.

In these views, 1 and 2 indicate the side members of the device, each member having its upper end curved inwardly and the lower end curved outwardly. The upper ends of the two side members rest in a channel shaped top piece 3 and the said ends are adjustably fastened in the channel shaped piece by means of the pair of washer plates 4 and the bolts 5 which pass through holes in the bottom of the channel shaped piece and through holes in the washer plate and through an elongated slot 6 in each side piece. The upper surface of the end of each side piece and the lower surface of the washer plate are corrugated or toothed, as shown at 7, so as to prevent one part slipping on the other. An upright member 8, having a forwardly projecting upper end 9, is fastened to the center of the channel shaped piece 3. Thus a yoke shaped member, for fitting over the neck of an animal, is provided which can be adjusted to fit the necks of various sizes of animals and which has an upright thereon which will engage fence wires, if an animal attempts to go through a fence and thus prevent the animal passing through the fence. The device is held on the neck by means of a chain 10 which has a ring 11 at each end thereof which is passed over the lower end of each side piece and is held in place by a tongue 12 struck from each side piece and bent over the ring. One end of the chain is detachably fastened to its ring by the snap hook 13 so that the chain can be detached to permit the device to be removed from the animal.

A U-shaped member 14 has a cross bar 15 connecting its ends together and this bar is adapted to pass through a hole formed in the nostrils of the animal. A side piece 16 is connected to each end of the bar 15 and each cross piece has a hole 17 therein to receive the snap hook 18 on a chain 19 which has its other end connected to a clevis 20 which is fastened to a side piece by a bolt 21. The side piece may be provided with a number of holes 22 any one of which is adapted to receive the bolt 21 so that the clevis can be adjusted on the side piece to regulate the amount of pressure placed on the nose device by the movement of the yoke on the animal's neck. The side pieces 16 prevent movement of the nose piece in the nostrils of the animal and if the animal should attempt to run, the movement of the yoke will be communicated to the nose piece through the chain 19 which will cause the animal pain and thus he will stop running. The projecting parts of the yoke will prevent an animal passing through a fence and the curved lower ends of the yoke with the enlargements 1' thereon will prevent the device from interfering with the service of the bull. These enlargements will also prevent the animal from jumping a fence.

Thus it will be seen that the device will not only prevent an animal from going through fences, but it will also stop him from running and jumping so that the bull will not chase people or leave his pasture.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A yoke of the class described comprising a pair of separate side pieces each having its upper end curved inwardly and its lower end curved outwardly, a channel-shaped member for receiving the upper ends of the two side pieces, a pair of washer plates in the channel-shaped member, each of which engages a part of each side piece, the upper end of each side piece having a slot therein and the channel-shaped member and the washer plates having openings therein, bolts passing through the openings in the channel-shaped member and the washer plates and through the slots in the side pieces for adjustably connecting the parts together, the contacting portions of the washer plates and the side pieces being roughened, an upright member connected with the central part of the channel-shaped member and a flexible member connected with the lower part of one side piece and detachably connected with the lower part of the other side piece.

2. A yoke of the class described comprising a pair of separate side pieces each having its upper end curved inwardly and its lower end curved outwardly, a channel-shaped member for receiving the upper ends of the two side pieces, a pair of washer plates in the channel-shaped member, each of which engages a part of each side piece, the upper end of each side piece having a slot therein and the channel-shaped member and the washer plates having openings therein, bolts passing through the openings in the channel-shaped member and the washer plates and through the slots in the side pieces for adjustably connecting the parts together, the contacting portions of the washer plates and the side pieces being roughened, an upright member connected with the central part of the channel-shaped member, a flexible member connected with the lower part of one side piece and detachably connected with the lower part of the other side piece, a member for engaging the nose of an animal and flexible members for connecting said member with the side pieces.

In testimony whereof I affix my signature.

CANUTE H. MICKELSEN.